(12) United States Patent
Hunt et al.

(10) Patent No.: US 10,438,767 B2
(45) Date of Patent: Oct. 8, 2019

(54) THRUST FLANGE FOR X-RAY TUBE WITH INTERNAL COOLING CHANNELS

(71) Applicant: General Electric Company, Schenectady, NY (US)

(72) Inventors: Ian Strider Hunt, Milwaukee, WI (US); Kevin Kruse, Milwaukee, WI (US); Andrew Triscari, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/827,920

(22) Filed: Nov. 30, 2017

(65) Prior Publication Data

US 2019/0164716 A1 May 30, 2019

(51) Int. Cl.
| | |
|---|---|
| *H01J 35/00* | (2006.01) |
| *H01J 35/10* | (2006.01) |
| *F16C 37/00* | (2006.01) |
| *H05G 1/02* | (2006.01) |
| *H05G 1/00* | (2006.01) |

(52) U.S. Cl.
CPC .......... *H01J 35/101* (2013.01); *F16C 37/002* (2013.01); *H01J 35/106* (2013.01); *H05G 1/00* (2013.01); *H05G 1/02* (2013.01); *H05G 1/025* (2013.01); *F16C 2316/10* (2013.01); *H01J 2235/1013* (2013.01); *H01J 2235/1046* (2013.01); *H01J 2235/1208* (2013.01); *H01J 2235/1266* (2013.01); *H01J 2235/1279* (2013.01)

(58) Field of Classification Search
CPC ............. H01J 35/101; H01J 2235/1046; H01J 2235/1208; H01J 2235/1266; H01J 2235/1279; H05G 1/02; H05G 1/04; H05G 1/06; H05G 1/00; H05G 1/025; F16C 37/002; F16C 2316/10
See application file for complete search history.

(56) References Cited

U.S. PATENT DOCUMENTS

| | | | |
|---|---|---|---|
| 3,695,685 A | 10/1972 | Colucci | |
| 4,115,718 A * | 9/1978 | Eggelsmann | H01J 35/101 313/149 |
| 4,577,651 A | 3/1986 | Murtz | |
| 5,068,885 A | 11/1991 | Vetter | |
| 5,077,781 A * | 12/1991 | Iversen | H01J 35/106 378/132 |

(Continued)

*Primary Examiner* — Kiho Kim
(74) *Attorney, Agent, or Firm* — Boyle Fredrickson, S.C.

(57) ABSTRACT

A bearing structure for an X-ray tube is provided that includes a journal bearing shaft with a radially protruding thrust bearing flange encased within a bearing housing or sleeve. The sleeve includes a thrust seal that is engaged with the sleeve in a manner to maintain coaxiality for the rotating liquid metal seal formed in the sleeve about the shaft. The shaft includes a central bore containing a cooling tube that directs coolant within the bore to maximize the heat transfer from the shaft to the coolant, allowing materials with lower thermal conductivities, such as steel, to be used to form the bearing shaft. The thrust flange on the shaft is formed with channel(s) therein that enable the coolant and/or the liquid metal to effect greater heat transfer on the components of the sleeve through the thrust flange, thereby reducing thermal deformation of the bearing components.

20 Claims, 6 Drawing Sheets

(56) References Cited

U.S. PATENT DOCUMENTS

| | | |
|---|---|---|
| 5,541,975 A | 7/1996 | Anderson et al. |
| 5,602,898 A | 2/1997 | Vetter et al. |
| 5,737,387 A | 4/1998 | Smither |
| 6,160,868 A * | 12/2000 | Snyder .................. H01J 35/105 378/127 |
| 6,192,107 B1 | 2/2001 | Price et al. |
| 6,327,340 B1 | 12/2001 | Runnoe |
| 6,477,236 B1 | 11/2002 | Anno et al. |
| 6,594,340 B2 | 7/2003 | Saito |
| 8,009,806 B2 | 8/2011 | Legall |
| 2005/0036585 A1* | 2/2005 | Bathe .................... F16C 17/102 378/132 |
| 2006/0256923 A1* | 11/2006 | Weil ...................... H01J 35/106 378/127 |
| 2011/0280376 A1 | 11/2011 | Behling et al. |
| 2016/0133431 A1* | 5/2016 | Hunt ..................... H01J 35/101 378/132 |

\* cited by examiner

THRUST FLANGE FOR X-RAY TUBE WITH INTERNAL COOLING CHANNELS

BACKGROUND OF THE INVENTION

The invention relates generally to x-ray tubes, and more particularly to structures and methods of assembly for the bearing utilized in an x-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. In many configurations, the anode structure is supported by a liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the shaft supporting the target.

Advantages of liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys, among others, are typically used as the liquid metal in the bearing structure, as they tend to be liquid at room temperature and have adequately low vapor pressure, at operating temperatures, to meet the rigorous high vacuum requirements of an x-ray tube. However, liquid metals tend to be highly reactive and corrosive. Thus, a base metal that is resistant to such corrosion is desirable for the components that come into contact with the liquid metal bearing, such as the shaft of the anode assembly and is rotated for the purpose of distributing the heat generated at a focal spot.

As a result, the structure of the sleeve to which the anode is connected and the support shaft must be capable of withstanding the high temperatures and mechanical stresses created within the x-ray tube, as well as be able to withstand the corrosive effects of the liquid metal bearing. As such, a refractory metal such as molybdenum or tungsten is typically used as the base material for the construction of the sleeve or shell as well as for the other bearing components. Not only are such materials resistant to corrosion and high temperatures, but they tend to be vacuum-compatible and thus lend themselves to an x-ray tube application. In addition, because liquid metal bearings require geometries and/or tolerances that maintain fluid gaps between bearing surfaces on the order of single micrometers, using a highly thermal conductive and low expanding material such as molybdenum to form the bearing components enables the size of these gaps to be maintained despite high thermal gradients resulting from target heating.

However, as the refractory materials are difficult to machine, these surfaces are hard to manufacture without surface imperfections that enable leaks to occur in the seals. Also, due to the low galling/wear properties of the refractory materials, these surface imperfections, even if not present after machining, can occur during normal use of the tube resulting in the formation of fluid leaks, thereby shortening the useful life of the tube.

In an alternative construction for a liquid metal/spiral groove bearing structure, other metals, such as steel, can be utilized in place of the refractory metals for the construction of the sleeve and support shaft, such as disclosed in U.S. Pat. No. 6,477,236. While these other metals have a lower thermal conductivity, they have the benefits of low cost compared to the refractory metals, good machinability, good galling/wear characteristics, and good weldability. In particular, steel is a potential journal bearing material in x-ray tubes as it has better wear resistance compared to molybdenum. As such, these metals can be more easily constructed and joined to form the bearing sleeve.

However, one drawback to steel is that it has a much lower thermal conductance and higher coefficient of thermal expansion compared to molybdenum, making steel more prone to thermal gradients and resulting non-uniform bearing deflections, which in turn makes maintenance of the fluid gap sizes difficult. Further, another challenge presented by these properties of a steel bearing is that the steel parts expand more during use. This increased thermal deformation of the steel bearing components can directly result in bearing failure, such as though expansion of the gap creating leakage of the liquid metal lubricant. Additionally, the thermal deformation/expansion causes movement in the anode parts of the bearing, particularly in and through the thrust flange of the shaft, resulting in more movement of the focal spot than with a refractory metal bearing structure.

Therefore, it is desirable to develop a structure and method for the formation and operation of a bearing structure for an x-ray tube with an improved cooling structure to enable the use of low cost materials for the shaft to significantly improve heat transfer out of the bearing structure to minimize the thermal gradients and resulting deformation expansion and non-uniform bearing deflections in the bearing assembly structure.

BRIEF DESCRIPTION OF THE DISCLOSURE

In the present disclosure a liquid metal or spiral groove bearing structure for an x-ray tube and associated process for manufacturing the bearing structure is comprised of a journal bearing shaft with a radially protruding thrust bearing flange encased within a bearing housing or sleeve. The sleeve includes a thrust seal that is engaged with the sleeve in a manner to maintain coaxiality for the rotating liquid metal seal formed in the sleeve about the shaft. The shaft includes a central passage/bore for the introduction of a cooling fluid into the bearing assembly in which is disposed a cooling tube. The cooling tube directs the oil within the bore to maximize the heat transfer from the shaft to the oil, allowing materials with lower thermal conductivities, such as steel, to be used to form the bearing shaft. The thrust flange on the shaft is also formed with channels or passages extending therein that enable the cooling fluid and/or the liquid metal to effect greater heat transfer on the components of the sleeve through the thrust flange, thereby reducing thermal deformation of the bearing components.

The disclosure illustrates cooling of the thrust bearing and thrust bearing flange use of one or both of: 1) the liquid metal within the bearing and/or 2) an external fluid within the shaft. For both cooling fluids, the enhanced thrust flange cooling is achieved by replacing the material forming the thrust flange with a material of higher thermal conductivity, such as steel, and internal forced convection cooling performed within the flange. This disclosure is applicable to bearing assemblies formed of all material types, with bearing materials having a low thermal conductance and high thermal coefficient of expansion being more significantly benefited using the concepts of this disclosure.

The structures and methods of this disclosure enables the use of cheaper materials for the construction of bearing assemblies for X-ray tubes, which have lower thermal conductivity coefficients and higher thermal coefficients of expansion. These disclosed structures and methods implement expanded radial flow of the cooling fluid within the bearing structure/assembly, instead of simpler axial journal bearing flow, which can be formed as an easily manufacturable multi-piece shaft or a shaft capable of manufacture by additive manufacturing processes to provide the internal cooling for the thrust bearing/thrust flange.

In one exemplary embodiment of the invention, a bearing assembly for an X-ray tube includes a sleeve, a shaft rotatably disposed within the sleeve and including a bore extending through the shaft, the shaft forming a gap between the sleeve and the shaft and a thrust flange disposed on the shaft and including a channel formed within the thrust flange.

In another exemplary embodiment of the invention, an x-ray tube includes a cathode assembly and an anode assembly spaced from the cathode assembly, wherein the anode assembly has a sleeve, a shaft rotatably disposed within the sleeve and including a bore extending through the shaft, the shaft forming a gap between the sleeve and the shaft, a thrust flange disposed on the shaft and including a channel formed within the thrust flange and an anode target operably connected to the sleeve.

In still another exemplary embodiment of the method of the invention, a method for cooling a bearing assembly during use in an operating X-ray tube includes the steps of providing bearing assembly having a sleeve, a shaft rotatably disposed within the sleeve and including a bore extending through the shaft, the shaft forming a gap between the sleeve and the shaft and a thrust flange disposed on the shaft and including a channel formed within the thrust flange and directing a flow of coolant through the channel within the thrust flange.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
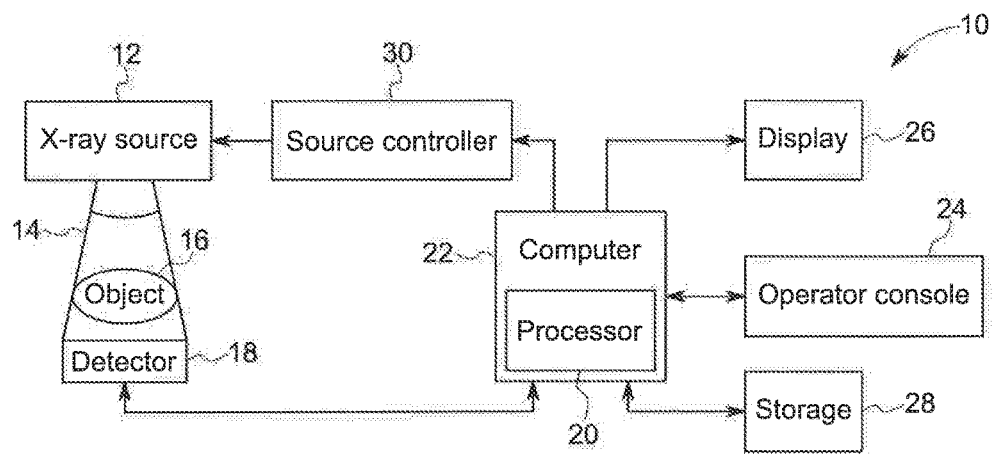
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
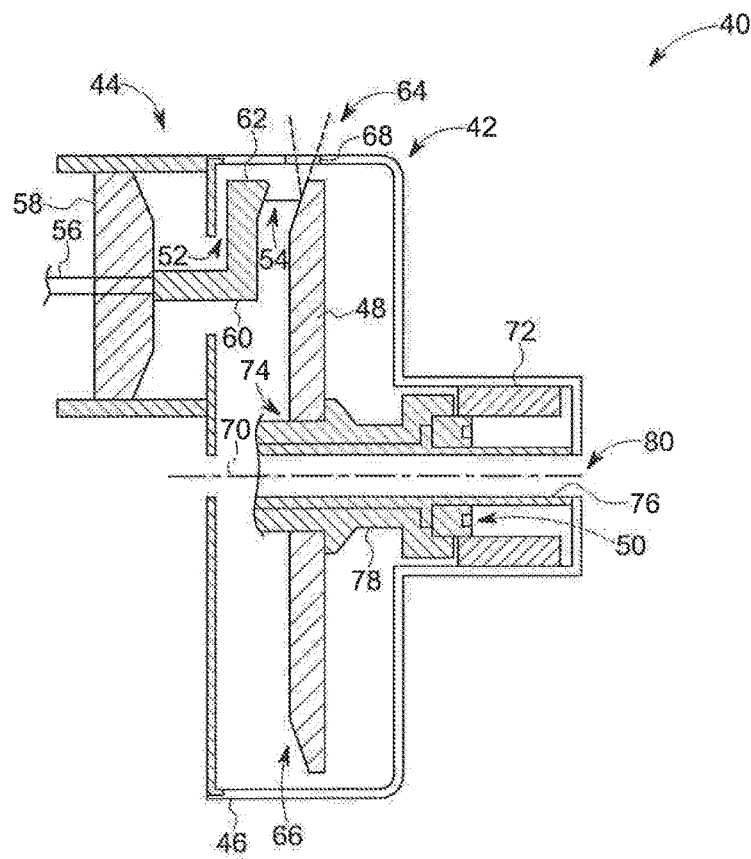
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and an annular opening 74 in the center thereof for receiving bearing assembly 50.

Target 48 may be manufactured to include a number of metals or composites, such as tungsten, molybdenum, or any material that contributes to Bremsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting bearing having adequate load-bearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as sleeve 78 to which the target 48 is attached. While center shaft 76 is described with respect to FIG. 2 as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Center shaft 76 includes a cavity, bore or coolant flow path 80 though which a coolant 82 (FIGS. 3-4), such as oil, flows to cool bearing assembly 50. As such, coolant 82 enables heat generated from target 48 of x-ray source 40 (FIG. 2) to be extracted therefrom and transferred external to x-ray source 40. In straddle mounted x-ray tube configurations, coolant flow path 80 extends along a longitudinal length of x-ray source 40. In alternative embodiments, bore 80 may extend through only a portion of x-ray source 40, such as in configurations where x-ray source 40 is cantilevered when placed in an imaging system.

Figure 3:
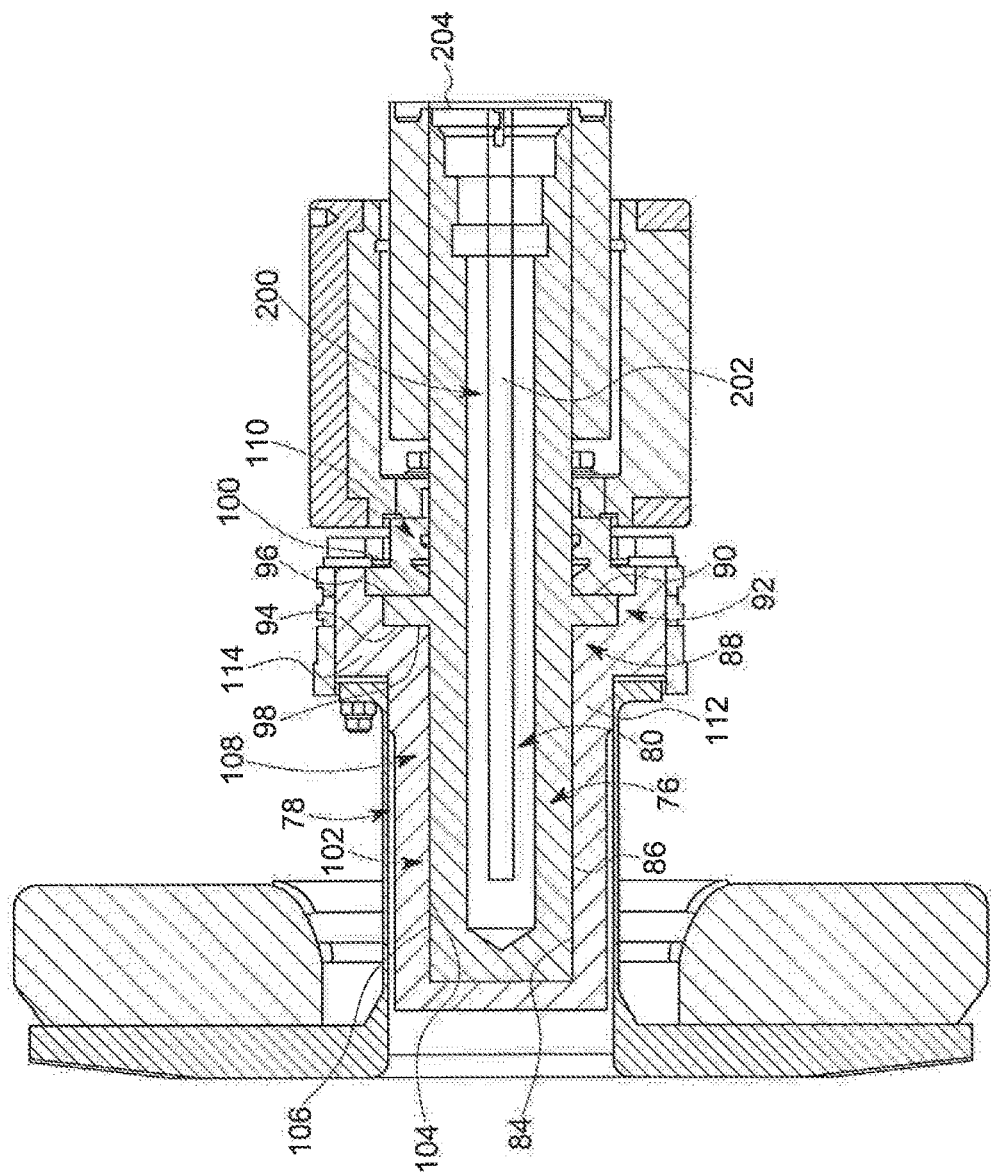
FIG. 3 is a cross-sectional side plan view of a bearing structure of an x-ray tube in accordance with an exemplary embodiment of the invention.

Referring now to FIG. 3, a cross-sectional view of a portion of bearing assembly or structure 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50.

The lubricating fluid 84 flowing between the rotating and stationary components of the bearing assembly or structure 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 3, center shaft 76 of bearing assembly 50 is a stationary component and sleeve 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft comprising a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, the embodiments of the invention disclosed herein are applicable to any bearing configuration having a rotatable component and a stationary component, and a liquid lubricant therebetween, regardless of configuration or application.

As illustrated in FIG. 3, center shaft 76 of bearing assembly 50 includes a thrust bearing flange 88 comprising a radial projection 90 that extends from center shaft 76 and is positioned in a radial cavity 92 of sleeve 78. Radial projection 90 of thrust bearing portion 88 includes a pair of outer bearing surfaces 94, 96 that face inner bearing surfaces 98, 100 of radial cavity 92 of sleeve 78. Radial projection 90 limits axial motion of sleeve 78 relative to center shaft 76, and, as illustrated, lubricant 84 is also included between radial projection 90 and shell 78. Radial projection 90 need not be limited in axial length, but may be extended in axial length to provide additional mechanical support of components.

The center shaft 76 also includes a radial or journal bearing 102 located adjacent and extending axially outwardly from the thrust bearing flange 88. An outer surface 104 of journal bearing 102 of center shaft 76 faces an inner surface 106 of sleeve 78. While journal bearing 102 is illustrated on a first side of thrust bearing portion 88 adjacent outer race surface 94, one skilled in the art will recognize that bearing assembly 50 may include a second journal bearing portion located on a second side of thrust bearing portion 88 adjacent outer race surface 96. Various coatings, textures, and patterns including grooves embedded in the contacting/bearing surfaces 94, 96, 98, 100, 102, 104 of bearing assembly 50 may be applied to alter bearing behavior as the shaft 76 and sleeve 78 rotate relative to each other.

Bearing assembly or structure 50 may be referred to as a spiral groove bearing (SGB) due to the patterning of grooves along the various surfaces 94, 96, 98, 100, 102, 104 of the bearing assembly 50. In some examples, the spiral groove may be formed from a logarithmic spiral shape. The spiral groove bearing may also be equivalently referred to as a fluid dynamic bearing and liquid bearing as well. In such spiral groove bearings, ways to contain the liquid lubricant 84 may be categorized in two general methods. The first includes providing physical barriers near the ends of the bearing where shaft seals would be placed in other applications. Rubber or other types of shaft seals in the presence of the vacuum inside the x-ray tube may function improperly, degrade quickly, and/or destroy the pressure inside the x-ray tube. For similar reasons, o-rings, grease, or other conventional means for aiding in rotational lubrication between two components may be undesirable because of the vacuum in the x-ray lube. Greases and other lubricants with lower vapor pressure than liquid metals may vaporize and destroy the vacuum. In some examples, physical walls of different shapes and sizes may be placed at different angles to capture the lubricant to reduce leakage through the bearing.

The second general method includes utilizing the capillary forces of the lubricant, wherein the small gap between two opposing bearing surfaces wets the fluid to retain the fluid within the gap. In other words, the anti-wetting properties of the surface (via texturing, coating, or both) aids in preventing the lubricant from flowing in between the small gaps. In some examples, the surfaces are coated and/or textured to be more wetted such that the lubricant clings in the small gap to reduce lubricant moving through the gap. In other examples, the surfaces are coated and/or textured to be more anti-wetting such that the lubricant is pushed away from the small gaps near the ends of the bearing assembly. In this context, the small gap may be in the range of 30-120 microns.

Operation of liquid bearings in x-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

The lubricating fluid in between bearing surfaces such as the shaft and sleeve are rotating relative to each other. As such, the lubricating fluid is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, shearing of the lubricating fluid imparts energy into the fluid which cases the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid.

In the exemplary embodiment of the invention illustrated in FIG. 3 the sleeve 78 is formed with a 2-piece construction including a sleeve 108 and a thrust seal 110. In the exemplary construction of the sleeve shown in FIG. 3, the sleeve 108 is formed of a material that is low cost, with good machinability, good galling/wear characteristics, and good weldability. Further, while these materials do conduct heat, optionally a thermal barrier can be included between the bearing assembly or structure 50 and the target 48 to maintain the temperatures in the bearing assembly 50 below the corrosion limits of the materials forming the bearing assembly 50. In an exemplary embodiment of the invention, the material forming the sleeve 108 is a non-refractory metal, such as an iron alloy, including stainless steel or tool carbon steel, among others. The sleeve 108 is formed as a single piece of the selected material, with a closed cylindrical cap portion 112 at one end and an open seating portion 114 at the opposite end. The seating portion 114 is integrally formed with the cap portion 112 to form a unitary structure for the sleeve 108, and has a diameter greater than that of the cap portion 112, such that the seating portion extends radially outwardly from the cap portion 112. In an alternative exemplary embodiment of the bearing assembly 50, the sleeve 78 can be formed with a spacer (not shown) disposed between the sleeve 108 and the thrust seal 110, where the spacer is formed of a suitable material, such as a metal including steel, that includes grooves (not shown) and/or suitable anti-wetting coatings (not shown) applied to the surfaces of the spacer disposed immediately adjacent and in contact with the sleeve 108 and the thrust seal 110 to form seals therebetween.

Looking now at FIG. 3, in the illustrated exemplary embodiment the shaft 76 includes a cooling tube 200 disposed within the bore 80. The tube 200 includes a shaft 202 that extends along the interior of the bore 80 and a retaining ring 204 that is secured to the shaft 76 around the open end of the bore 80. The cooling tube 200 functions to direct the coolant 82 into the bore of the shaft 76 through the shaft 202 where the coolant 82 comes into contact with the internal diameter of the bore 80. Heat from the shaft 76 is exchanged into the cooling fluid/coolant 82 upon contact of the coolant 82 with the shaft 76 and the heated coolant 82 is withdrawn from the bore 80 around the tube 200.

Figure 4:
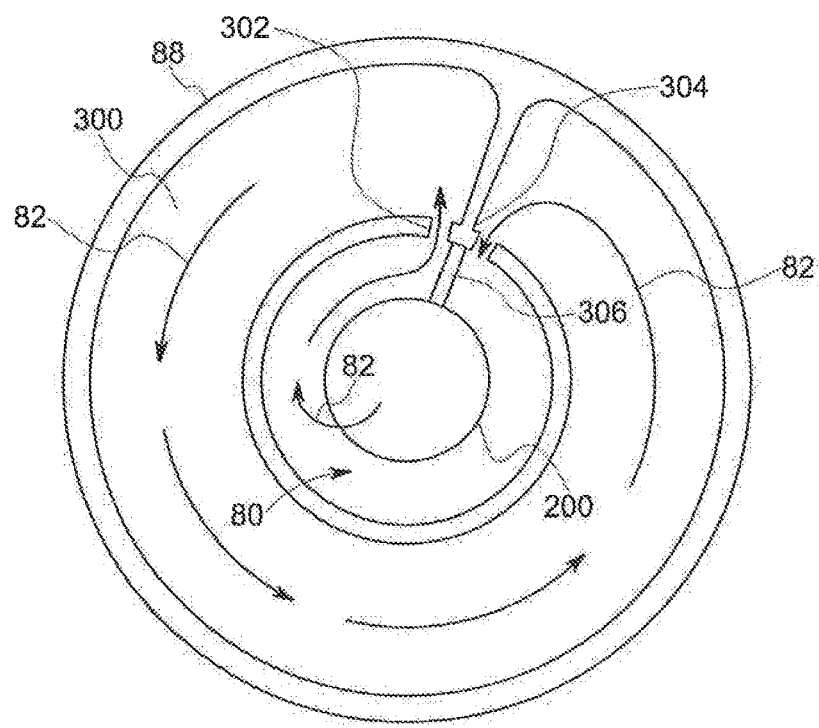
FIG. 4 is a cross-sectional view of the thrust flange of the bearing structure of FIG. 3 including a cooling channel therein formed in accordance with an exemplary embodiment of the invention.

Referring now to FIG. 4, in order to maximize the thermal contact of the coolant 82 with the component parts of the bearing assembly 50, the thrust bearing flange 88 is formed with a number of internal channels 300 that include inlets 302 and outlets 304 in fluid communication with the bore 80. The channels 300 enable the coolant 82 to flow under the force provided from the supply of the coolant 82 into the thrust bearing flange 88 and thermally contact the thrust bearing flange 88 as well as the sleeve 78, and in particular the cap seating portion 112 and the cap portion 114 located adjacent the thrust flange 88. By including the channels 300 within the thrust bearing flange 88, a significant reduction in the temperature of the thrust bearing flange 88 and the adjacent sections of the sleeve 78 is achieved, which consequently reduces the magnitude of the effects of the temperature gradient within the sleeve 78. Additionally, the thermal contact of the coolant 82 with the sleeve 78 through the channels 300 cools the sleeve 78 more than the shaft 76, which reduces the temperature gradient created within the sleeve 78 during operation of the tube 12 and bearing assembly 50, up to a reduction of the temperature by minimum 25% compared to the gradients present in a convention bearing assembly 50 formed from steel components but without the channels in the thrust bearing flange 88. In addition, the reduction in the thermal gradient created in the bearing assembly 60 thereby reduces the magnitude of any changes to the size of the gap 86, lessening the focal spot motion by minimum 30% in the operating bearing assembly 50 having the thrust flange 88 with internal coolant channels 300.

Referring now to FIG. 4, in one exemplary embodiment the flange 88 can include a single circumferential channel 300 that extends from an inlet 302 in communication with the bore 80 around the interior of the flange 88 to an outlet 304 also in communication with the bore 80 but spaced from the inlet 302. The inlet 302 and outlet 304 can also be separated from one another by a baffle 306 positioned on either the tube 80 the interior surface of the shaft 76 and located between the inlet 302 and the outlet 304. In the exemplary embodiment of FIG. 4 the coolant 82 flows around the entire perimeter of the flange 88 prior to exiting the channel 300. This construction provides increased stiffness to the flange 88 including the channel 300.

Figure 5:
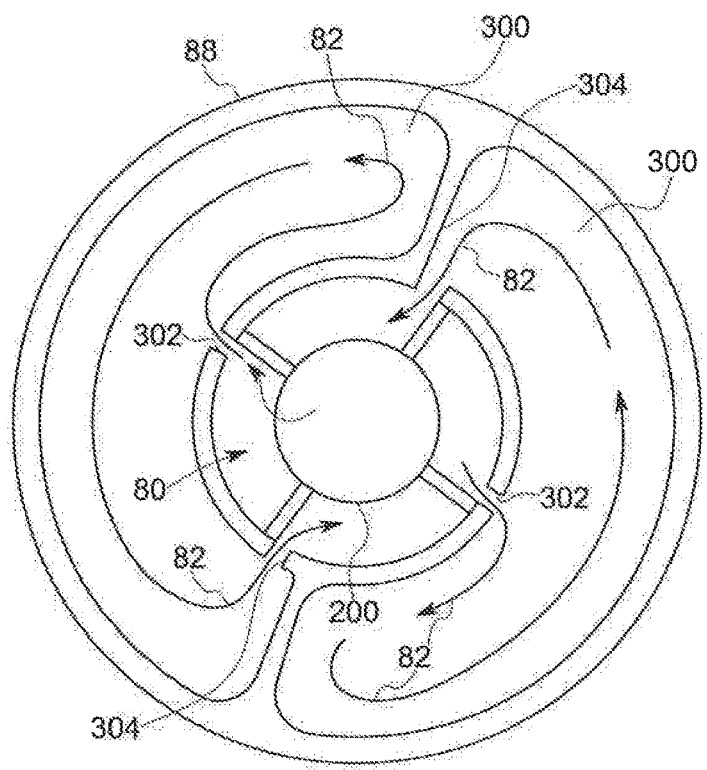
FIG. 5 is a cross-sectional view of the thrust flange of the bearing structure of FIG. 3 including a cooling channel therein formed in accordance with another exemplary embodiment of the invention.

In another exemplary embodiment illustrated in FIG. 5, the flange 88 includes a pair of channels 300, each including and inlet 302 and an outlet 304. The inlets 302 and outlets 304 are separated from one another by baffles 306 disposed between the inlets 302 and outlets 304 and extending between the tube 200 and the interior surface of the shaft 76.

Figure 6:
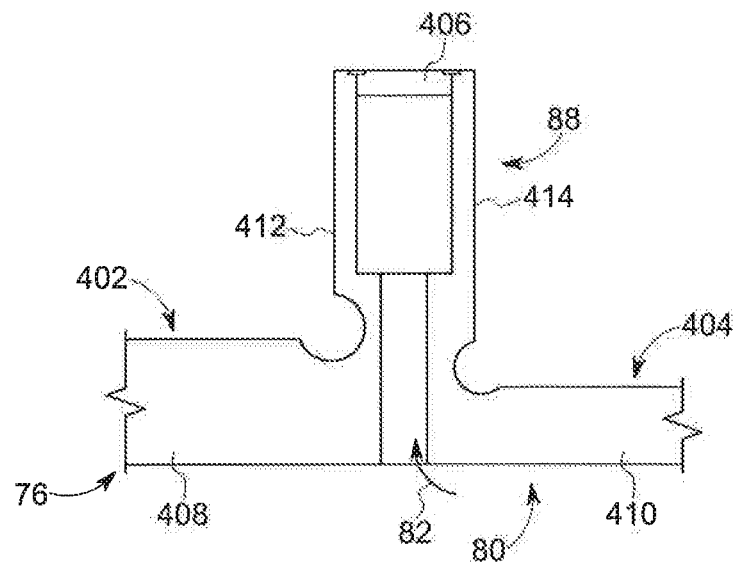
FIG. 6 is a cross-sectional view of the structure of the shaft and the thrust flange of the bearing structure of FIG. 3 including a cooling channel therein formed in accordance with another exemplary embodiment of the invention.

In each of the embodiments of FIGS. 4 and 5, the shaft 76 including the flange 88 with the channel(s) 300 can be manufactured in any suitable manner, such as in an additive manufacturing process compatible with the materials utilized to form the shaft 76 and/or the flange 88. In an alternative and exemplary embodiment, referring to FIG. 6 the shaft 76 can be formed with a pair of sections 402, 404 joined by a cover 406. The sections 402, 404 each include an axial portion 408, 410 and a radial portion 412, 414 disposed at one end of the axial portion 408, 410. The radial portions 412, 414 are molded, machined or otherwise formed to include the dimensions for opposed sides of the channel(s) 300, such that when the radial portions 412, 414 are positioned adjacent and joined to one another using the cover 406, the channel 300 is defined by the structures present on the radial portions 412, 414. The radial portions 412, 414 and the cover 406 secured to and between the radial portions 412, 414 in a suitable manner, such as by welding, form the thrust flange 88 of the shaft 76 formed by the sections 402, 404.

Figure 7:
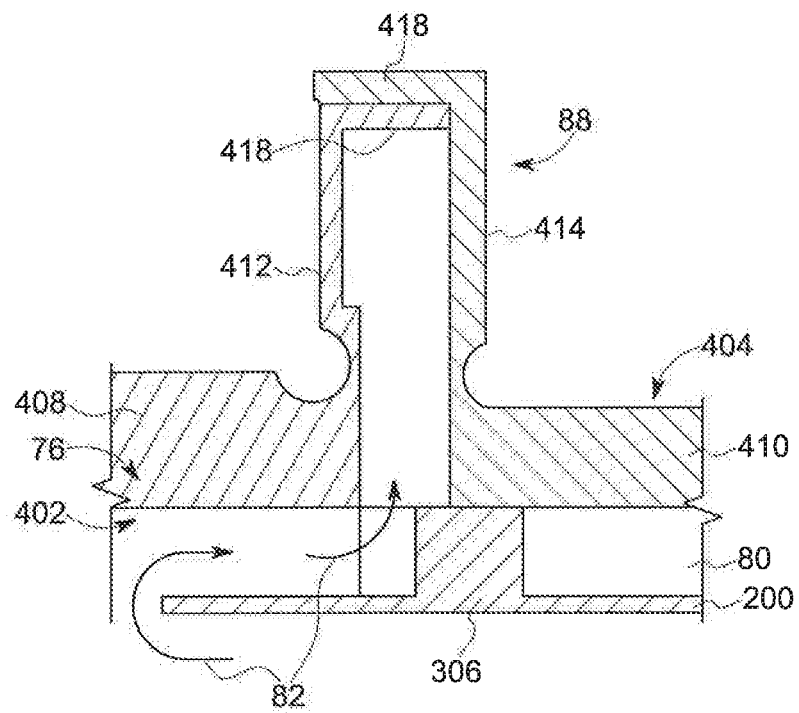
FIG. 7 is a cross-sectional view of the structure of the shaft and the thrust flange of the bearing structure of FIG. 3 including a cooling channel therein formed in accordance with another exemplary embodiment of the invention.

Looking now at FIG. 7, the shaft 76 is formed with the radial portions 412, 414 each including an end cap 416, 418 opposite the axial portion 408, 410. The length of one radial portion 412, 414 is formed to be slightly longer than the other radial portion 412, 414, such that the end caps 416, 418 are positioned in an overlapping configuration when the sections 402, 404 are joined to one another. The end caps 416, 418 can be affixed to one another in any suitable manner, such as by hermetically welding, pressing and/or brazing the end caps 416, 418 to one another.

Figure 8:
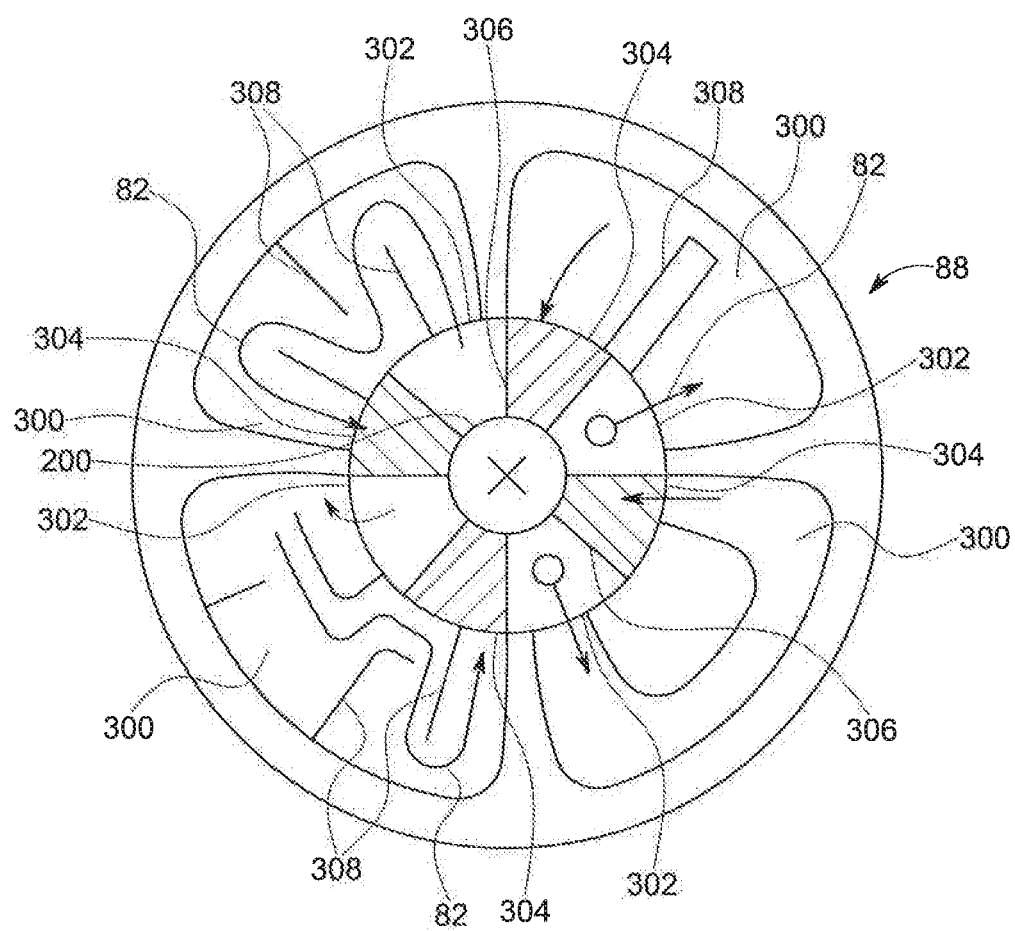
FIG. 8 is a cross-sectional view of the thrust flange of the bearing structure of FIG. 3 including various cooling channels therein formed in accordance with another exemplary embodiment of the invention.

Referring now to FIGS. 7 and 8, in another exemplary embodiment, the channel(s) 300 can be formed with internal baffles 308 that operate to direct the flow of coolant 82 through the channel 300 in a winding flow path through the channel 300 to increase the thermal contact/residence time of the coolant 82 within the flange 88. The channels 300 can be formed identically to one another or with variations in the configuration and/or baffles 308 located within each channel 300. In addition, in these or any other embodiments, the baffles 306 can be formed as part of the tube 80 and can include an alternating circumferential orientation to properly direct the coolant 82 into and out of the channel(s) 300 within the flange 88. Further, the baffles 306 can be constructed to direct all or a selected portion of the coolant 82 through the channel(s) 300.

Figure 9:
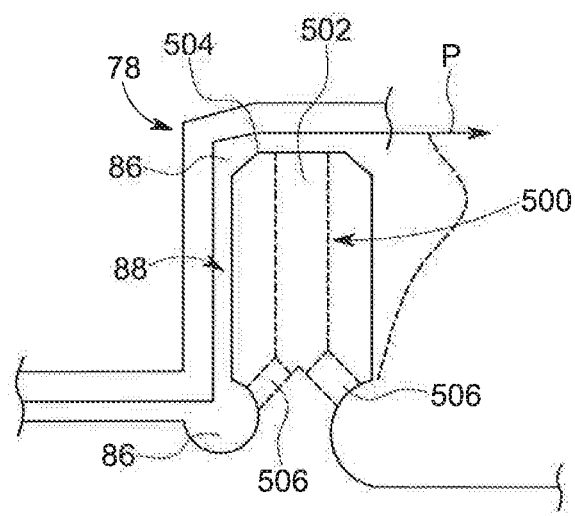
FIG. 9 is a cross-sectional view of the thrust flange of the bearing structure of FIG. 3 including a cooling channel therein formed in accordance with another exemplary embodiment of the invention.
Figure 10:
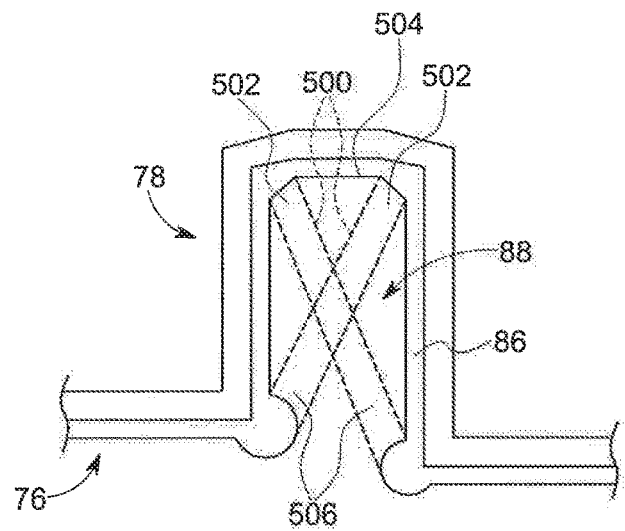
FIG. 10 is a cross-sectional view of the thrust flange of the bearing structure of FIG. 3 including various cooling channels therein formed in accordance with another exemplary embodiment of the invention.

Looking now at the illustrated exemplary embodiment of FIG. 9, in constructing the shaft 76, the thrust flange 88 is formed of a material having a higher thermal conductivity than steel, such as molybdenum or other refractory material, that is secured to the remainder of the shaft 76 in any suitable manner. The flange 88 is formed with internal channel(s) 500 that are not in fluid communication with the bore 80 but are in fluid communication with the gap 86. As such, the liquid metal 84 contained in the gap 86 is allow to flow through the channels 500 within the flange 88, thereby providing additional cooling to the stationary flange 88 and the components of the sleeve 78 adjacent the flange 88. The liquid metal 84 flows within and through the channel(s) 500 within the stationary thrust flange 88 as a result of forced convection. This forced convection is produced by the design of the thrust bearing 88 which naturally creates a pressure profile P formed by the centrifugal forces of the rotating surfaces of the sleeve 78 and the liquid metal 84 around the stationary flange 88 and that increases in the radial direction as shown in FIG. 9. This convection drives the liquid metal 84 at the outer edge of the flange 88 into and through the channel(s) 500 back toward the shaft 78, where the fluid 84 can be cooled through thermal contact with the shaft 76. In the exemplary embodiment of FIG. 9 the channel(s) 500 includes an inlet 502 at the outermost edge 504 of the flange 88 and extends through the flange 88 to one or more outlets 506 disposed on opposed sides of the base 508 of the flange 88. The design of the outlets 506 and direction of the channel(s) 500 can be designed utilizing the forces on the liquid metal 84 produced from gantry motion and the low pressure locations of the journal bearing 98, 100 and thrust bearings 94, 96. In addition, the channel(s) 500 can provide additional functionality, such as exhausting gases from the bearing assembly 50 and replenishing the liquid metal 84 in the gap 86 through the channel(s) 500 formed within the flange 88. In addition, the flange 88 or a portion thereof can be made out of copper or high conducting alloy that is completely surrounded by bearing material to avoid reaction with the liquid metal, such as gallium.

In an alternative exemplary embodiment, the flange 88 can include a number of channels 500 that extend across the flange 88 to provide multiple flows of the liquid metal 84 into direct contact with the shaft 76 to increase the cooling provided by the flange 88.

Figure 11:
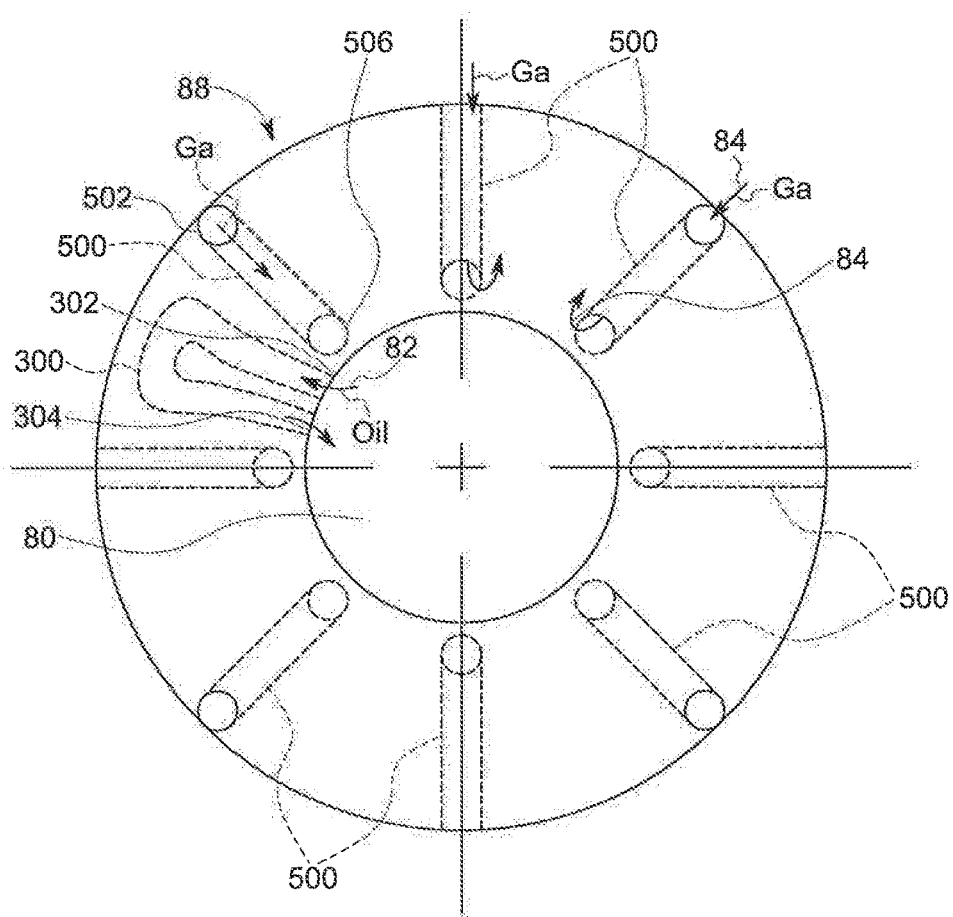
FIG. 11 is a front plan view of the thrust flange of the bearing structure of FIG. 3 including various cooling channels therein formed in accordance with another exemplary embodiment of the invention.

Referring now to FIG. 11, the flange 88 can be formed with a combination of the channel(s) 300 and internal channel(s) 500. In this embodiment the flange 88 includes a number of channel(s) that direct coolant 82 through the flange 88 concurrently with the channel(s) 500 enabling force convection to create flows of the liquid metal 84 thought flange 88 without direct contact but with thermal contact with the coolant 82 to enhance heat transfer from the flange 88 to the coolant 82 with the consequent reduction in thermal deformation and focal spot movement.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for an X-ray tube, the bearing assembly comprising:
   a sleeve;
   a shaft rotatably disposed within the sleeve and including a bore extending through the shaft, the shaft forming a gap between the sleeve and the shaft; and
   a thrust flange disposed on the shaft and including a channel formed within the thrust flange.

2. The bearing assembly of claim 1, wherein the thrust flange includes at least one channel extending through the thrust flange and having an inlet in communication with the bore and an outlet in communication with the bore.

3. The bearing assembly of claim 2, further comprising at least one external baffle positioned between the inlet and the outlet.

4. The bearing assembly of claim 3, further comprising a cooling tube disposed within the bore, and wherein the at least one external baffle extends between the thrust flange and the cooling tube.

5. The bearing assembly of claim 4, wherein the at least one external baffle is formed on the cooling tube.

6. The bearing assembly of claim 2, wherein the at least one channel includes at least one internal baffle disposed within the at least one channel between the inlet and the outlet.

7. The bearing assembly of claim 1, wherein the flange includes at least one internal channel extending through the thrust flange and having an inlet in communication with the gap and an outlet in communication with the gap.

8. The bearing assembly of claim 7, wherein the inlet is disposed approximately at an outer edge of the flange opposite the bore.

9. The bearing assembly of claim 7, wherein the outlet is disposed approximately at an inner edge of the flange adjacent the bore.

10. The bearing assembly of claim 7, wherein the thrust flange is formed of a material different than a material forming the shaft.

11. The bearing assembly of claim 1, wherein the thrust flange includes a first radial portion secured to a second radial portion around the shaft.

12. The bearing assembly of claim 11, wherein the first radial portion and second radial portion are joined by a cover.

13. The bearing assembly of claim 11, wherein the cover is formed on at least one of the first radial portion or the second radial portion.

14. A method for cooling a bearing assembly during use in an operating X-ray tube, the method comprising the steps of:
   providing bearing assembly comprising:
      a sleeve;
      a shaft rotatably disposed within the sleeve and including a bore extending through the shaft, the shaft forming a gap between the sleeve and the shaft; and
      a thrust flange disposed on the shaft and including a channel formed within the thrust flange; and
   directing a flow of coolant through the channel within the thrust flange.

15. The method of claim 14, wherein the step of directing the flow of coolant through the channel comprises directing a flow of cooling oil from the bore through the channel.

16. The method of claim 14, wherein the step of directing the flow of coolant through the channel comprises directing a flow of liquid metal from the gap through the channel.

17. The method of claim 14, wherein the step of directing the flow of coolant through the channel comprises:
   directing a flow of cooling oil from the bore through a first channel; and
   directing a flow of liquid metal from the gap through a second channel.

18. An x-ray tube comprising:
   a cathode assembly; and
   an anode assembly spaced from the cathode assembly, wherein the anode assembly comprises:
     a sleeve;
     a shaft rotatably disposed within the sleeve and including a bore extending through the shaft, the shaft forming a gap between the sleeve and the shaft;
     a thrust flange disposed on the shaft and including a channel formed within the thrust flange; and
     an anode target operably connected to the sleeve.

19. The x-ray tube of claim 18, wherein the channel is in fluid communication with the bore.

20. The x-ray tube of claim 18, wherein the channel is in fluid communication with the gap.

\* \* \* \* \*